US012320903B2

United States Patent
Sohn et al.

(10) Patent No.: US 12,320,903 B2
(45) Date of Patent: Jun. 3, 2025

(54) MULTIPLE AND CASCADED REDUNDANT DISCIPLINED OSCILLATOR SYSTEMS IN A SPOOFING RESISTANT REFERENCE TIME SOURCE SYSTEM AND METHODS THEREOF

(71) Applicant: Orolia USA Inc., W. Henrietta, NY (US)

(72) Inventors: David Sohn, Pittsford, NY (US); John Fischer, Corfu, NY (US); Matthias Lorentz, Choisel (FR)

(73) Assignee: Orolia USA Inc., West Henrietta, NY (US)

( * ) Notice: Subject to any disclaimer, the term of this patent is extended or adjusted under 35 U.S.C. 154(b) by 406 days.

(21) Appl. No.: 17/975,935

(22) Filed: Oct. 28, 2022

(65) Prior Publication Data
US 2023/0046689 A1    Feb. 16, 2023

Related U.S. Application Data

(63) Continuation-in-part of application No. 17/374,465, filed on Jul. 13, 2021, now Pat. No. 12,019,166.

(51) Int. Cl.
*G01S 19/21*    (2010.01)
*G01S 19/23*    (2010.01)
*H04B 17/29*    (2015.01)

(52) U.S. Cl.
CPC ............ *G01S 19/215* (2013.01); *G01S 19/23* (2013.01); *H04B 17/29* (2015.01)

(58) Field of Classification Search
CPC ....... G01S 19/215; G01S 19/23; H04B 17/29; H04J 3/0688; H04L 63/1466
See application file for complete search history.

(56) References Cited

U.S. PATENT DOCUMENTS 5,568,097 A    10/1996    Woodman, Jr.
5,666,330 A     9/1997    Zampetti
(Continued)

FOREIGN PATENT DOCUMENTS

CN    101441585 8    7/2010

OTHER PUBLICATIONS

Scholz, Arthur K., "The Flip: More Robust Timing Applications Using GPS," Hssedi, Nov. 8, 2019.
(Continued)

*Primary Examiner* — David B Lugo
(74) *Attorney, Agent, or Firm* — TROUTMAN PEPPER LOCKE LLP

(57) ABSTRACT

A system, non-transitory computer readable medium, and method include entering redundant oscillators and a cascaded oscillator of a spoofing resistant system into an initialization state. All but one of the redundant oscillators are disciplined to a time-and-frequency external input into normal disciplining state with the remaining one of the redundant oscillators in a holdover state. When all but one of the redundant oscillators have reached the normal disciplining state, placing all but one of the redundant oscillators into the holdover state, disciplining the remaining one of the redundant oscillators to the time and frequency external input, and disciplining the cascaded oscillator to one of the all but one of the redundant oscillators now in the holdover state. When the remaining one of the redundant oscillators and the cascaded oscillator have reached the normal disciplining state, transitioning from an initialization stage to a steady state management stage.

18 Claims, 4 Drawing Sheets

(56) References Cited

U.S. PATENT DOCUMENTS

| | | | |
|---|---|---|---|
| 5,812,822 | A | 9/1998 | Selway et al. |
| 6,141,769 | A | 10/2000 | Petivan et al. |
| 6,640,311 | B1 | 10/2003 | Knowles |
| 7,317,361 | B2 | 1/2008 | Duven et al. |
| 7,487,377 | B2 | 2/2009 | Swaney et al. |
| 9,595,972 | B2 | 3/2017 | Milijevic et al. |
| 10,338,229 | B2 | 7/2019 | Levy et al. |
| 10,466,363 | B2 | 11/2019 | Lombardi |
| 2009/0058538 | A1 | 3/2009 | Kantor et al. |
| 2010/0220006 | A1* | 9/2010 | Arab ............ G04G 7/026 342/357.26 |
| 2011/0103337 | A1 | 5/2011 | Bryant et al. |
| 2012/0082188 | A2* | 4/2012 | Nicholls ........ H04W 56/0015 375/145 |
| 2017/0060101 | A1 | 3/2017 | Abbott et al. |
| 2019/0361130 | A1* | 11/2019 | Leibner ............ H04K 3/90 |
| 2022/0221588 | A1* | 7/2022 | Elgersma .......... G01S 19/215 |

OTHER PUBLICATIONS

Soualle, F., et al., "New Concept for the On-Board Master Clock Generation Unit for Future Galileo Satellites," Proceedings of the 2010 International Technical Meeting of The Institute of Navigation, Jan. 25-27, 2010 (Abstract).

PCT/CA2010/000828 (Published on Dec. 23, 2010, as WO2010/144996 A1), "System and Method for Selecting Optimum Local Oscillator Discipline Source," Smiley, Russell and Nicholls, Charles.

* cited by examiner

MULTIPLE AND CASCADED REDUNDANT DISCIPLINED OSCILLATOR SYSTEMS IN A SPOOFING RESISTANT REFERENCE TIME SOURCE SYSTEM AND METHODS THEREOF

This application is a continuation-in-part of prior Ser. No. 17/374,465, filed Jul. 13, 2021, which is hereby incorporated by reference in its entirety.

FIELD

This technology relates to multiple and cascaded redundant disciplined oscillator systems in a spoofing resistant reference time source system.

BACKGROUND

There are a variety of different types of reference time source systems, such as Global Navigation Satellite System (GNSS) system, grandmaster clocks, and primary time reference systems by way of example. With a GNSS system, a GNSS receiver determines a precise position on the surface of the earth by measuring the signal propagation time from multiple orbiting satellites. Each of these satellites has a precision clock in it which is accurately synchronized by ground control stations which are linked to the UTC time reference. Thus, a side benefit of these navigation systems is that the Earth is covered with a precise time synchronization signal. Other reference time source systems may use other external reference inputs in place of or in addition to GNSS but allow for distribution of time synchronization from system to system.

With traditional time synchronization, synchronization is typically achieved using a low-cost GNSS or other external reference receiver managed as an input component and a timing processor to improve the accuracy of a stable local oscillator (such as an Oven Controlled crystal Oscillator (OCXO) or atomic oscillator). More specifically, the input component is used in conjunction with the controllable oscillator and the timing processor to control or "discipline" the controllable oscillator to the more accurate frequency reference derived from the input component. The one Pulse Per Second (1PPS) signal from the input component is used as a reference to phase lock the stable local oscillator. A controllable oscillator (such as a voltage-controlled oscillator (VCO)) is used so it can be adjusted in phase relative to the 1PPS reference.

Accordingly, using an external reference to discipline a local oscillator improves its accuracy and can synchronizes it to the absolute UTC time reference. However, using this external reference opens a reference time source system up to spoofing attacks. In particular, a system could be pulled out of sync by a bad actor, and this could be catastrophic if the timing system is used in a critical infrastructure application.

SUMMARY

A spoofing resistant reference time source system includes an oscillator system comprising three or more redundant oscillators and a cascaded oscillator coupled to a switching system and an oscillator management computing device. The oscillator management computing device comprises a memory coupled to a processor which is configured to execute programmed instructions stored in the memory to: enter the three or more redundant oscillators and the cascaded oscillator into an initialization state: discipline all but one of the redundant oscillators to a time and frequency external input into normal disciplining steady state with the remaining one of the redundant oscillators in a holdover state; when all but one of the redundant oscillators have reached the normal disciplining steady state, place all but one of the redundant oscillators into the holdover state, discipline the remaining one of the redundant oscillators to the time and frequency external input, and discipline the cascaded oscillator to one of the all but one of the redundant oscillators now in the holdover state; and when the remaining one of the redundant oscillators and the cascaded oscillator have reached the normal disciplining steady state, transition from an initialization stage to a steady state management stage.

A non-transitory computer readable medium having stored thereon instructions comprising executable code which when executed by at least one processor, cause the processor to: enter three or more redundant oscillators and a cascaded oscillator of a spoofing resistant reference time source system into an initialization state: discipline all but one of the redundant oscillators to a time and frequency external input into normal disciplining steady state with the remaining one of the redundant oscillators in a holdover state; when all but one of the redundant oscillators have reached the normal disciplining steady state, place all but one of the redundant oscillators into the holdover state, discipline the remaining one of the redundant oscillators to the time and frequency external input, and discipline the cascaded oscillator to one of the all but one of the redundant oscillators now in the holdover state; and when the remaining one of the redundant oscillators and the cascaded oscillator have reached the normal disciplining steady state, transition from an initialization stage to a steady state management stage.

A method includes entering, by a computing device, three or more redundant oscillators and a cascaded oscillator of a spoofing resistant reference time source system into an initialization state. All but one of the redundant oscillators are disciplined to a time and frequency external input into normal disciplining steady state with the remaining one of the redundant oscillators in a holdover state. When all but one of the redundant oscillators have reached the normal disciplining steady state, placing, by a computing device, all but one of the redundant oscillators into the holdover state, disciplining, by a computing device, the remaining one of the redundant oscillators to the time and frequency external input, and disciplining, by a computing device, the cascaded oscillator to one of the all but one of the redundant oscillators now in the holdover state. When the remaining one of the redundant oscillators and the cascaded oscillator have reached the normal disciplining steady state, transitioning, by a computing device, from an initialization stage to a steady state management stage.

This technology provides a number of advantages including providing methods and devices that counter reference time source spoofing attacks through unique configurations of multiple redundant and cascaded disciplined oscillators in a time server system. With examples of this spoofing resistant technology, the time server system can substantially reduce the mean time between failure. Additionally, examples of this technology are advantageously able to identify and address various fault conditions in addition to being resistant to spoofing.

DETAILED DESCRIPTION

Figure 1:
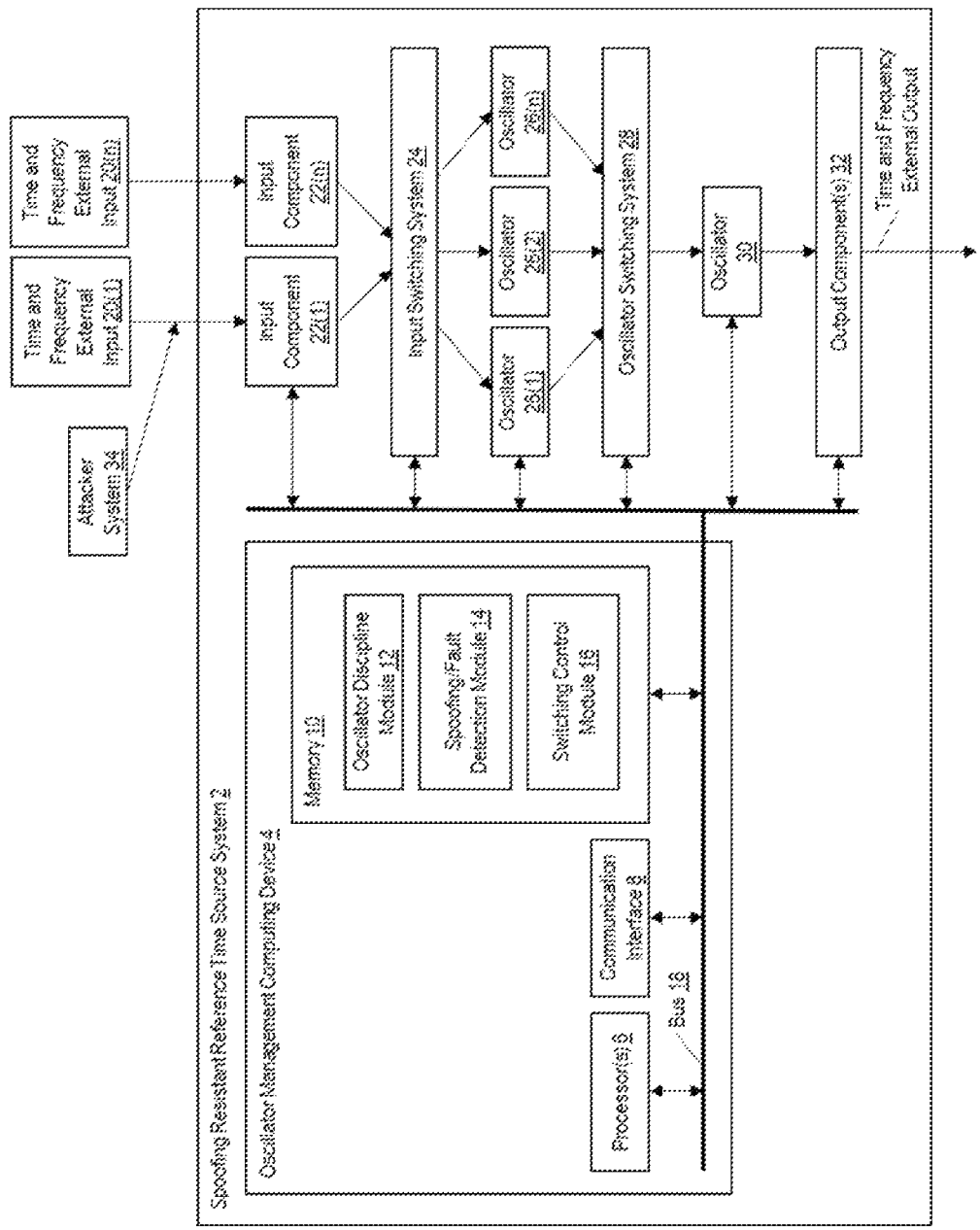
FIG. 1 is a block diagram of an exemplary environment with an example of a spoofing resistant reference time source system.

An environment with an example of a spoofing resistant reference time source system 2 is illustrated in FIG. 1. In this example, the environment includes the spoofing resistant reference time source system 2, time and frequency external inputs 20(1)-20(n), and an attacker system 34, although other types and/or numbers of other systems, devices, components, and/or other elements in other configurations may be used, such as other time and frequency external inputs and attacker systems. This technology provides a number of advantages including providing methods and devices that counter spoofing attacks through unique configurations of multiple redundant and cascaded disciplined oscillators in a spoofing resistant reference time source system.

Referring more specifically to FIG. 1, in this example the spoofing resistant reference time source system 2 includes an oscillator management computing device 4, input components 22(1)-22(n), an input switching system 24, redundant oscillators 26(1)-26(n), an oscillator switching system 28, a cascaded oscillator 30, and output component(s) 32 which are coupled together by a bus or other communication link 18, although the system could include other types and/or numbers of systems, devices, components, and/or other elements in other configurations, such as other input components and redundant oscillators.

The oscillator management computing device 4 of the spoofing resistant reference time source system 2 includes at least one processor 6, a memory 10, and a communication interface 8, although the oscillator management computing device 4 can include other types and/or numbers of systems, devices, components, and/or other elements in other configurations. The processor 6 of the oscillator management computing device 4 may execute programmed instructions stored in the memory 10 for the any number of the functions or other operations illustrated and described by way of the examples herein. The processor 6 of the oscillator management computing device 4 may include one or more CPUs or other processors with one or more processing cores, for example, although other types of processor(s) can also be used.

The memory 10 of the oscillator management computing device 4 stores these programmed instructions for one or more aspects of the present technology as illustrated and described herein, although some or all of the programmed instructions could be stored elsewhere. By way of example, one or more aspects of the technology may be executed in a cloud computing environment by one or cloud computing servers. A variety of different types of memory storage devices, such as random access memory (RAM), read only memory (ROM), hard disk (HDD), solid state drives (SSD), flash memory, or other computer readable medium which is read from and written to by a magnetic, optical, or other reading and writing system that is coupled to the processor (s) 6, can be used for the memory 10.

Accordingly, the memory 10 of the oscillator management computing device 4 can store application(s) that can include executable instructions that, when executed, cause the oscillator management computing device 4 to perform actions, such as to transmit, receive, or otherwise process signals related to navigation or other positioning, to detect and counter spoofing attacks, and to perform other actions, such as detect faults, as illustrated and described by way of the examples herein with reference to FIGS. 1-4. The application(s) can be implemented as modules or components of other application(s). Further, the application(s) can be implemented as operating system extensions, modules, plugins, or the like. In this example, the memory 10 includes an oscillator discipline algorithm or module 12, a spoofing/fault detection module 14, and a switching control algorithm or module 16, although the memory may have other types and/or numbers of other algorithms, modules, programmed instructions, and/or other data.

The oscillator disciplining algorithm or module 12 includes programmed instructions to control an output of one or more of the redundant oscillators 26(1)-26(n) to agree with one or more of the time and frequency external inputs 20(1)-20(n) received by one or more of the input components 22(1)-22(n) and to control an output of cascaded oscillator 30 to agree with the output of one or more of the redundant oscillators 26(1)-26(n) as well as execute other functions as illustrated and described by way of the examples herein.

In this example, the spoofing/fault detection module 14 includes programmed instructions for one or more algorithms to monitor at least one of frequency or time synchronization outputs from one or more of input components 22(1)-22(n) and one or more of the oscillators 26(1)-26(n) and provide an alert or other action when any spoofing or a fault is detected as well as execute other functions as illustrated and described by way of the examples herein. By way of example, the spoofing/fault detection module may encompass one or more individual algorithms analyzing different time and frequency metrics, or specific input signal metrics that may come from input components 22(1)-22(n) like GNSS receiver data, NTP state data, or PTP datasets by way of example, although other metrics may be monitored. By way of example, one or more algorithms may be used and aggregated including direct threshold or range checks, statistical analysis, or artificial intelligence (AI)/machine learning (ML) techniques by way of example, although other algorithms or analysis techniques and combinations may be used.

The switching control algorithm or module 16 includes programmed instructions to control configuration of input switching system 24 to connect one or more of input components 22(1)-22(n) to one or more of redundant oscillators 26(1)-26(n), and output switching system 28 to cascaded oscillator 30 as well as execute other functions as illustrated and described by way of the examples herein.

The communication interface 8 of the oscillator management computing device 4 operatively couples and communicates between the oscillator management computing device 4 and the input components 22(1)-22(n), the input switching system 24, the redundant oscillators 26(1)-26(n), oscillator switching system 28, and cascaded oscillator 30 which are all coupled together by one or more bus or communication network(s) 18, although other types and/or numbers of connections and/or configurations to other devices and/or elements can be used. By way of example only, the communication network(s) can include local area network(s) (LAN(s)) or wide area network(s) (WAN(s)), and/or wireless networks by way of example only, although other types and/or numbers of protocols and/or communication networks can be used.

The input components 22(1)-22(n), the input switching system 24, the one or more redundant oscillators 26(1)-26(n), the oscillator switching system 28, and cascaded oscillator 30 of the spoofing resistant reference time source system 2 are coupled together in various configurations as illustrated by way of examples herein, although the time server system 2 may have other configurations. One or more of the input components 22(1)-22(n) are configured to capture signals from time and frequency external inputs 20(1)-20(n). By way of example only, the time and frequency external inputs may be Global Navigation Satellite Systems (GNSS) such as Global Positioning System (GPS), Galileo, GLONASS, or Beidou with input components including single or multiple frequency GNSS receivers. The time and frequency external inputs may be other signals or network connections like a one (1) pulse per second (PPS), inter range instrumentation group (IRIG), network time protocol (NTP), precision time protocol (PTP) with input components capable of receiving those signals, although other signals and input components capable of receiving them may be used.

In various examples, one or more of the redundant oscillators 26(1)-26(n) (shown as oscillators 26(1), 26(2) and 26(n) in FIG. 1) are each an oscillator whose output is controlled to agree with the signals received from one or more input components 22(1)-22(n). A variety of different types of oscillators, such as temperature controlled crystal oscillators (TCXO), oven controlled crystal oscillators (OCXO), double oven controlled crystal oscillators (DOCXO), rubidium or other atomic oscillators, in single or ensemble configurations may be used for redundant oscillators 26(1)-26(n) although other numbers and/or types of controlled or disciplined oscillators or other timing elements with similar accuracy may be used.

In this example, the input switching system 24 is configured to manage the connection of the one or more of the input components 22(1)-22(n) to one or more disciplined redundant oscillators 26(1)-26(n) as shown by way of example in FIG. 1, although the input switching system 24 may have other types and/or numbers of other configurations and/or functions. The switching system 24 may comprise various numbers and/or types of switches, such as one or more selection switches, although other types and/or numbers of switches in other configurations may be used as illustrated by way of examples herein.

In this example the oscillator switching system 28 is configured to manage the connection of one or more of the redundant oscillators 26(1)-26(n) to a cascaded oscillator 30 as shown by way of example in FIG. 1, although the oscillator switching system 24 may have other types and/or numbers of oscillators in other configurations and/or with other functions. The switching system 24 may comprise various numbers and/or types of switches, such as one or more selection switches, although other types and/or numbers of switches in other configurations may be used as illustrated by way of examples herein.

Further, in this example the attacker system 34 includes at least one processor, a memory, a communication interface, a time and frequency output, which are coupled together by a bus or other communication link, although the attacker system 34 can include other types and/or numbers of systems, devices, components, and/or other elements in other configurations. The attacker system 34 may receive signal and may generate a time and frequency external input to, for example, the spoofing resistant reference time source system 2.

Although in this exemplary environment the spoofing resistant reference time source system 2, the time and frequency external inputs 20(1)-20(n), and attacker equipment computing device 34 are illustrated and described in the illustrative examples herein, other types and/or numbers of systems, devices, components, and/or elements in other topologies can be used. It is to be understood that the systems of the examples described herein are for exemplary purposes, as many variations of the specific hardware and software used to implement the examples are possible, as will be appreciated by those skilled in the relevant art(s).

Portions of all of the examples of the technology illustrated and described herein may also be embodied as one or more non-transitory computer readable media having instructions stored thereon for one or more aspects of the present technology. The instructions in some examples include executable code that, when executed by the processor of the oscillator management computing device 16, cause the processor to carry out steps necessary to implement the methods of the examples of this technology that are illustrated and described herein.

Exemplary methods for an initialization stage and managing a steady state management stage by detecting and countering spoofing, faults and/or other disciplining issues in spoofing resistant reference time source system 2 will now be described by way of various examples with reference to FIGS. 1-4.

Figure 2:
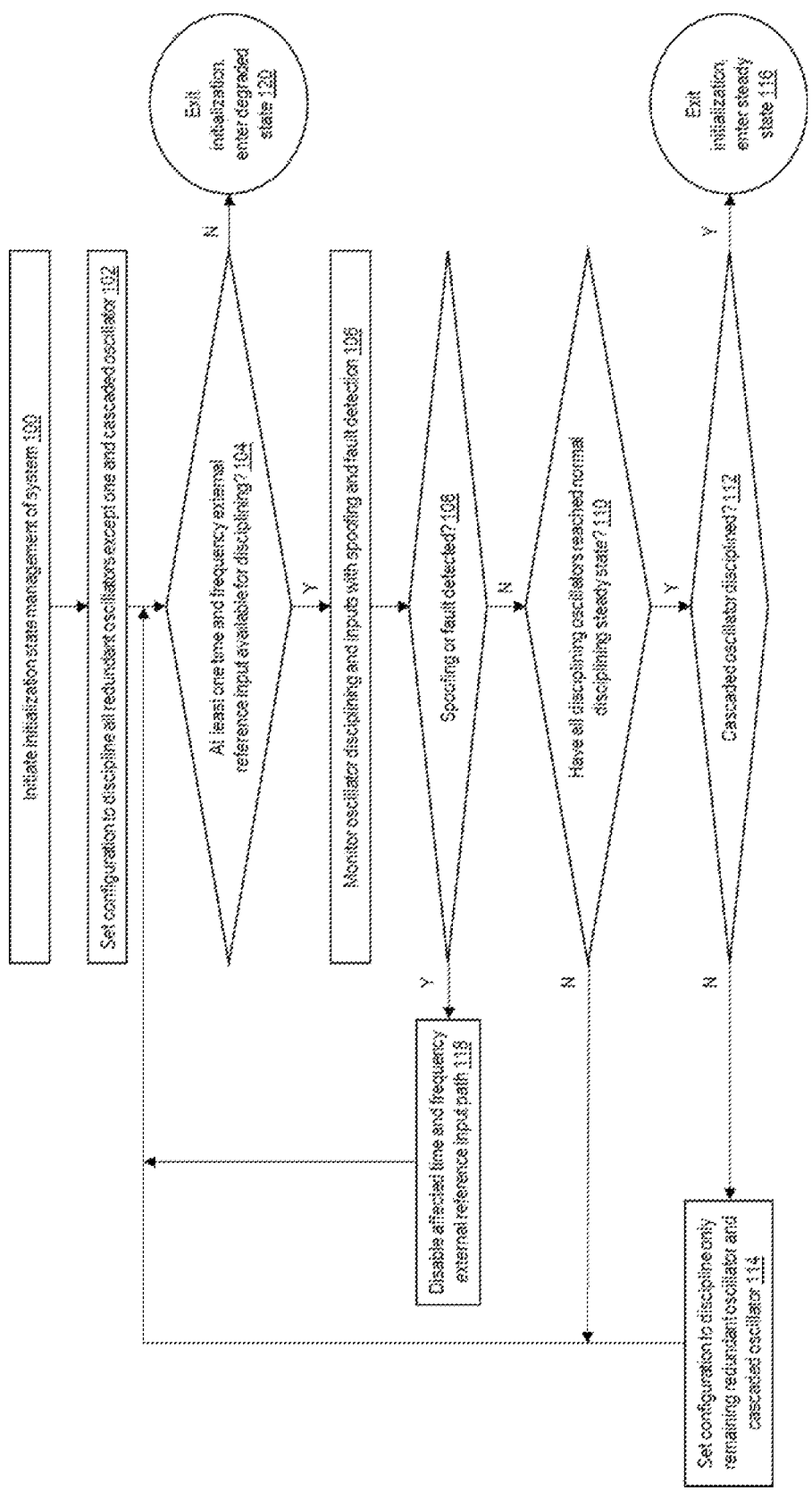
FIG. 2 is a flowchart of an example of the method for managing an initialization stage of multiple redundant and cascaded oscillators in the spoofing resistant reference time source system.

Exemplary Initialization Stage:

Referring more specifically to FIGS. 1-2, a system and flow chart of an example of a method for an initialization stage for redundant oscillators 26(1)-26(n) and the cascaded oscillator 30 in spoofing resistant reference time source system 2 is illustrated. In this example, in step 100 the initialization stage of spoofing resistant reference time source system 2 is initiated.

In step 102, all but one of the redundant oscillators 26(1)-26(n) are configured to be disciplined by one or more time and frequency external inputs from one or more of the input components 22(1)-22(n). In this particular example, the oscillator management computing device 4 executes programmed instructions in the switching control module 16 to configure the input switching system 24 to connect one or more of the input components 22(1)-22(n) to all but one of the redundant oscillators 26(1)-26(n).

In step 104, the oscillator management computing device 4 determines if at least one time and frequency external reference input through an enabled input component 22(1)-22(n) from the configuration in step 102 is available for disciplining redundant oscillators 26(1)-26(n). If in step 104, the oscillator management computing device 4 determines no enabled input components 22(1)-22(n) from the configuration are available, then the No branch is taken to step 120 to exit this example of the method and enter a degraded state illustrated and described by way of example with reference to FIG. 4. If in step 104, the oscillator management computing device 4 determines at least one enabled input component 22(1)-22(n) from the configuration is available, then the Yes branch is taken to step 106.

In step 106, the oscillator management computing device 4 executes programmed instructions in the oscillator disciplining module 12 to discipline in parallel each of the all but one of the redundant oscillators 26(1)-26(n) to the one or more of the enabled input components 22(1)-22(n) through the input switching system 24, although other manners for disciplining may be used. All but one of the redundant oscillators 26(1)-26(n) are updated from the one or more of the input components 22(1)-22(n) through the input switching system 24 until all but one of the redundant oscillators 26(1)-26(n) have been disciplined to reach a steady state phase and frequency lock condition, also referred to as a normal disciplining steady state.

In step 106, the oscillator management computing device 4 also executes the spoofing/fault detection module 14 to monitor for one or more metrics related to the disciplining of all but one of the redundant oscillators 26(1)-26(n) and the one or more external time and frequency input through input components 22(1)-22(n) for any spoofing or fault. By way of example, metrics may include oscillator steering values, system versus input phase comparison values, system versus input frequency comparison values, and/or oscillator temperature values which can be used for analysis against, for example, stored values, ranges or other thresholds to detect any spoofing or fault in the next step.

In step 108, the oscillator management computing device 4 executes the spoofing/fault detection module 14 to analyze the monitored metrics to detect any spoofing or fault, although the analysis could be for other types of disciplining issues. By way of example, the oscillator management computing device 4 may be configured to analyze different time and frequency metrics and/or other specific input signal metrics based on direct threshold checks, range checks, analysis for statistical deviations, or trained artificial intelligence (AI)/machine learning (ML) detection techniques to identify any spoofing or faults.

If in step 108, the analysis of the monitored metrics by the oscillator management computing device 4 detects any spoofing, a fault, or other type of disciplining issue, then the Yes branch is taken to step 118. In step 118, oscillator management computing device 4 disables any of the time and frequency external inputs associated with the detected spoof, fault or other disciplining issue. This prevents further degradation of any of the redundant oscillators 26(1)-26(n).

If back in step 108, the analysis of the monitored metrics by the oscillator management computing device 4 does not detect any spoofing, a fault, or other type of disciplining issue, then the No branch is taken to step 110. In step 110, the oscillator management computing device 4 determines if each of the all but one of the redundant oscillators 26(1)-26(n) have reached a normal disciplining steady state. If the oscillator management computing device 4 determines each of the all but one of the redundant oscillators 26(1)-26(n) have not reached a normal disciplining steady state, then the No branch is taken back to step 104 as described earlier. If the oscillator management computing device 4 determines each of the all but one of the redundant oscillators 26(1)-26(n) have reached a normal disciplining steady state, then the Yes branch is taken to step 112.

In step 112, the oscillator management computing device 4 the cascaded oscillator 30 is disciplined to one of the all but one of the redundant oscillators 26(1)-26(n) that has reached the normal disciplining steady state. Next, the oscillator management computing device 4 determines if the cascaded oscillator 30 has reached the normal disciplining steady state. If the oscillator management computing device 4 determines the cascaded oscillator 30 has reached the normal disciplining steady state, then the Yes branch is taken to step 116 where the spoofing resistant reference time source system 2 can exit the initialization state and enter the normal disciplining steady state.

If the oscillator management computing device 4 determines the cascaded oscillator 30 has not reached the normal disciplining steady state, then the No branch is taken to step 114. In step 114, the oscillator management computing device 4 sets all but one of the redundant oscillators 26(1)-26(n) to free run and the remaining one of the redundant oscillators 26(1)-26(n) and the cascaded oscillator 30 are configured to be disciplined. In this example, the oscillator management computing device 4 executes the switching control module 16 to configure the input switching system 24 to connect one of the input components 22(1)-22(n) to the remaining one of the redundant oscillators 26(1)-26(n) to discipline the remaining one of the redundant oscillators 26(1)-26(n). When the oscillator management computing device 4 determines that remaining one of the redundant oscillators 26(1)-26(n) has been disciplined to the normal disciplining steady state, then the oscillator management computing device 4 executes the switching control module 16 to configure the oscillator switching system 28 to connect the remaining one of the redundant oscillators 26(1)-26(n) to discipline the cascaded oscillator 30 to the normal disciplining steady state, although other manners for disciplining the remaining one of the redundant oscillators 26(1)-26(n) and the cascaded oscillator 30 may be used. Next, the oscillator management computing device 4 returns to step 104 to try and discipline all but one of the redundant oscillators 26(1)-26(n) as described earlier.

Accordingly, as illustrated in the example above, the method for an initialization stage for the redundant oscillators 26(1)-26(n) and the cascaded oscillator 30 in spoofing resistant reference time source system 2 provides a protected initialization process with a capability for spoofing or a fault detection by maintaining some oscillators out of the redundant oscillators 26(1)-26(n) and cascaded oscillator 30 in a free-run state. Oscillators in free-run can be used as comparative references that are protected from any potential interference coming from an attacker system 34 affecting time and frequency external inputs 20(1)-20(n).

Exemplary Disciplining Rotation Period, $\tau_d$:

In these examples, the period for disciplining a single one of the redundant oscillators 26(1)-26(n) needs to be long enough so that a slow-moving spoofer can be detected, but not so long that the free running redundant oscillators 26(1)-26(n) controlling the spoofing resistant reference time source system 2 has drifted beyond its accuracy specification. The spoofing resistant reference time source system 2 is always effectively in a holdover state, it is just being refreshed by a new accurately disciplined one of the redundant oscillators 26(1)-26(n) from a time and frequency external input 20(1)-20(n) every $\tau_d$. If we refer to the specified holdover time of the system as $\tau_H$ (for example, a spoofing resistant reference time source system 2 that maintains 1 us time accuracy over 24 hours: $\tau_H$=24 hours), then we want the rotation period to be much less than this. Suggest starting off with $\tau_d < 0.1 * \tau_H$. In attempting to prevent attacks based on a known fixed rotation period, $\tau_d$ should have a random component to randomize the rotation period keeping it longer than the time to recover synchronization, but still less than the suggested $0.1 * \tau_H$.

Figure 3:
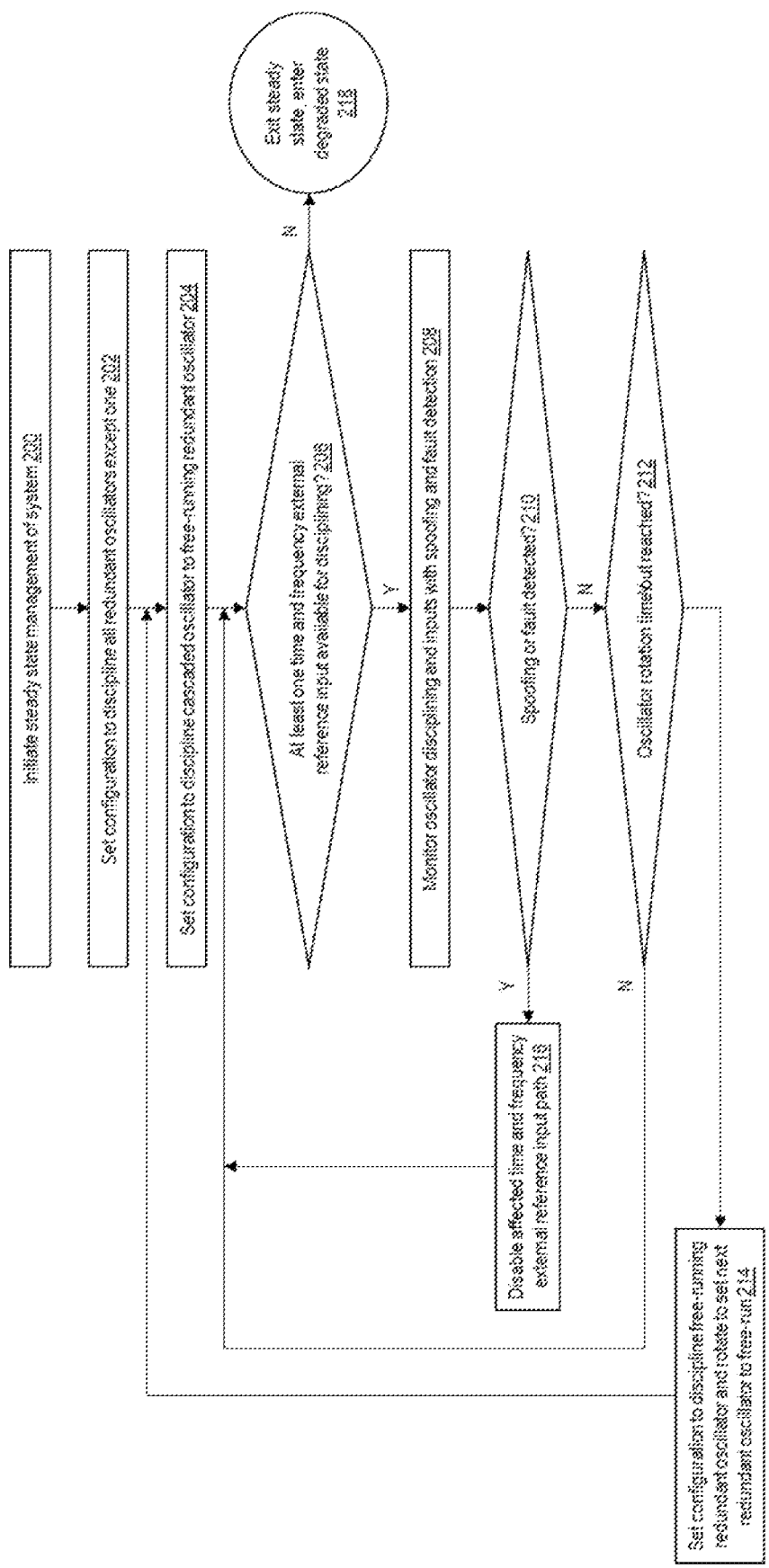
FIG. 3 is a flowchart of an example of the method for managing steady state operation in the spoofing resistant reference time source system.

Exemplary Steady State Management Stage:

Referring more specifically to FIGS. 1 and 3, a functional block diagram and flowchart of an example of a method for steady state management stage for the redundant oscillators 26(1)-26(n) and the cascaded oscillator 30 in the spoofing resistant reference time source system 2 is illustrated.

In this example, once initialization stage is complete (as illustrated by way of the example in FIG. 2), then in FIG. 3 starting in step 200 the oscillator management computing device 4 initiates steady state management of the redundant oscillators 26(1)-26(n) and the cascaded oscillator 30 in the spoofing resistant reference time source system 2.

In step 202, the oscillator management computing device 4 executing the switching control module 16 sets configurations of one or more switches in the input switching system 24 to discipline all but one of the redundant oscillators 26(1)-26(n) from the input components 22(1)-22(n). Once all but one of the redundant oscillators 26(1)-26(n) have reached the normal steady state, then all but one of the redundant oscillators 26(1)-26(n) are placed in a holdover state.

In step 204, the oscillator management computing device 4 executing the switching control module 16 sets configurations of one or more switches in the oscillator switching system 28 to discipline the cascaded oscillator 30 to one of the all but one of the redundant oscillators 26(1)-26(n) which are now in the holdover state. As a result, the cascaded oscillator 30 is never connected through disciplining to one of the redundant oscillator 26(1)-26(n) that is itself disciplining to time and frequency external inputs 20(1)-20(n), which may be subject to attacker system 34.

In step 206, the oscillator management computing device 4 determines if at least one time and frequency external reference input through an enabled input component 22(1)-22(n) is available for disciplining all but one of the redundant oscillators 26(1)-26(n). If in step 206, the oscillator management computing device 4 determines at least one time and frequency external reference input is not available, then the No branch is taken to step 218. In step 218, the spoofing resistant reference time source system 2 is placed in a degraded state illustrated and described by way of example with reference to FIG. 4 and this example of the method ends.

If back in step 206, the oscillator management computing device 4 determines at least one time and frequency external reference input is available, then the Yes branch is taken to step 208. In step 208, the oscillator management computing device 4 executing the spoofing/fault detection module 14 monitors metrics associated with the disciplining of redundant oscillators 26(1)-26(n) and external time and frequency input paths through input components 22(1)-22(n) and analyzes those. monitored metrics to detect spoofing, a fault, or another disciplining issue.

In step 210, the oscillator management computing device 4 executing the spoofing/fault detection module 14 determines if spoofing, a fault, or another disciplining issue is detected based on the monitoring from step 208. If in step 210, the oscillator management computing device 4 determines spoofing, a fault, or another disciplining issue has not been detected then the No branch is taken to step 212.

In step 212, the oscillator management computing device 4 determine if the disciplining has continued for a set or otherwise prescribed duration. If the oscillator management computing device 4 determines the disciplining has not completed the set rotation duration $\tau_d$, then No branch is taken back to step 206 as described earlier. If the oscillator management computing device 4 determines the disciplining has completed the set rotation duration $\tau_d$, then Yes branch is taken to step 214.

In step 214, the oscillator management computing device 4 executing the switching control module 16 configures the input switching system 24 to change the one of the redundant oscillators 26(1)-26(n) in the holdover state to another one of the redundant oscillators 26(1)-26(n) which is connected through the input switching system 24 to one or more of the time and frequency external inputs 20(1)-20(n) through one or more of the input components 22(1)-22(n).

If back in step 210, the oscillator management computing device 4 determines spoofing, a fault, or another disciplining issue has been detected then the Yes branch to step 216. In step 216, the oscillator management computing device 4 disables the affected time and frequency external input path through the associated input components 22(1)-22(n) which prevents further degradation of the disciplining redundant oscillators 26(1)-26(n). next, the oscillator management computing device 4 executing the switching control module 16 will adjust the selection of input components 22(1)-22(n) through the input switching system 24 to the disciplining redundant oscillators 26(1)-26(n) to another one of the input components 22(1)-22(n) with an available time and frequency input.

Accordingly, as illustrated in the example above, the method for steady state management stage for redundant oscillators 26(1)-26(n) and cascaded oscillator 30 in spoofing resistant reference time source system 2 allows for a protected steady state operation with a capability for spoofing or a fault detection by maintaining an oscillator out of the redundant oscillators 26(1)-26(n) in a holdover state and disciplining the cascaded oscillator 30. The one of the redundant oscillators 26(1)-26(n) in the holdover state and the cascaded oscillator 30 can be used as comparative references that are protected from any potential interference coming from an attacker system 34 affecting time and frequency external inputs 20(1)-20(n).

Figure 4:
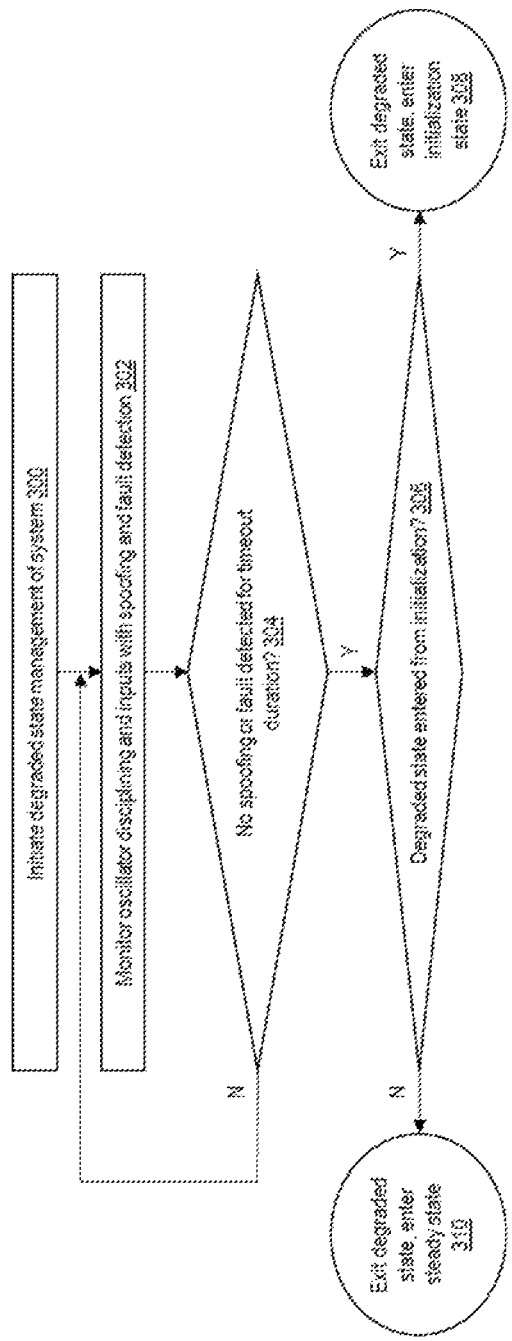
FIG. 4 is a flowchart of an example of the method for managing degraded state operation in the spoofing resistant reference time source system.

Exemplary Management of Degraded State Operations:

Referring more specifically to FIGS. 1 and 4, a functional block diagram and flowchart of an example of a method for managing a degraded state for the redundant oscillators 26(1)-26(n) and cascaded oscillator 30 is illustrated.

In this example, once entering the degraded state from initialization stage or steady state as illustrated by way of the examples in FIGS. 2-3, then in FIG. 4 starting in step 300 the oscillator management computing device 4 initiates degraded state management of the redundant oscillators 26(1)-26(n) and cascaded oscillator 30 in the spoofing resistant reference time source system 2.

In step 302, the oscillator management computing device 4 executing spoofing/fault detection module 14 monitors metrics associated with the disciplining of redundant oscillators 26(1)-26(n) and external time and frequency input paths through input components 22(1)-22(n) and analyzes the monitored metrics for any detected spoofing, fault, or other disciplining issues.

In step 304, the oscillator management computing device 4 determines if any spoofing, fault, or other disciplining issues is not detected based on the monitoring and analysis in step 302. If the oscillator management computing device 4 determine any spoofing, fault, or other disciplining issues is detected, then the No branch is taken back to step 302 as described earlier. If the oscillator management computing device 4 determines any spoofing, fault, or other disciplining issues is not detected, then the Yes branch is taken to step 306.

In step 306, the oscillator management computing device 4 determines if the degraded state was entered into from initialization stage. If oscillator management computing device 4 determines the degraded state was entered into from initialization stage, then the Yes branch is taken to step 308 to exit this example of the method and return to the initialization stage illustrated and described by way of example with reference to FIG. 2. Otherwise, if the oscillator management computing device 4 determines the degraded state was not entered into from initialization stage, then the No branch is taken to step 310 to exit this example of the method and return to the steady state process illustrated and described by way of example with reference to FIG. 3.

Accordingly, as illustrated and described by way of the examples herein, examples of this technology provide a number of advantages including methods and devices that counter spoofing attacks through unique configurations of multiple redundant and cascaded disciplined oscillators in a time server system. With examples of this spoofing resistant technology, the time server system is able to substantially reduce the mean time between failure. Additionally, examples of this technology are advantageously able to identify and address various fault conditions in addition to being resistant to spoofing.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations, therefore, is not intended to limit the claimed processes to any order except as may be specified in the claims. Accordingly, the invention is limited only by the following claims and equivalents thereto.

What is claimed is:

1. A spoofing resistant reference time source system comprising:
    an oscillator system comprising three or more redundant oscillators and a cascaded oscillator coupled to a switching system and an oscillator management computing device;
    the oscillator management computing device comprising a memory coupled to a processor which is configured to execute programmed instructions stored in the memory to:
        enter the three or more redundant oscillators and the cascaded oscillator into an initialization state:
        discipline all but one of the redundant oscillators to a time and frequency external input into normal disciplining steady state with the remaining one of the redundant oscillators in a holdover state;
        when the all but one of the redundant oscillators have reached the normal disciplining steady state, place the all but one of the redundant oscillators into the holdover state, discipline the remaining one of the redundant oscillators to the time and frequency external input, and discipline the cascaded oscillator to one of the all but one of the redundant oscillators now in the holdover state; and
        when the remaining one of the redundant oscillators and the cascaded oscillator have reached the normal disciplining steady state, transition from an initialization stage to a steady state management stage.

2. The system as set forth in claim 1 further comprising executable code which when executed by a processor causes the processor to:
    during the initialization state, monitor one or more metrics during the discipline of the all but one of the redundant oscillators and the one or more time and frequency external inputs coupled through one or more input components for a disciplining issue;
    identify the disciplining issue based on an analysis of the one or more metrics:
    disable any of the all but one of the redundant oscillators or the one or more time and frequency external inputs associated with the identified disciplining issue; and
    transition to a degraded state when all of the all but one of the redundant oscillators or all of the one or more time and frequency external inputs are in the degraded state.

3. The system as set forth in claim 1 further comprising executable code which when executed by a processor causes the processor to:
    enter three or more redundant oscillators and the cascaded oscillator into a steady state management stage comprising instructions to:
        discipline all but one of the redundant oscillators to a time and frequency external input setting the cascaded oscillator to discipline to the remaining one of the redundant oscillators in the holdover state; and
        output time and frequency external outputs coupled to the cascaded oscillator;
    during the steady state management stage, monitor one or more metrics during the discipline of the all but one of the redundant oscillators and the one or more time and frequency external inputs coupled through one or more input components for a disciplining issue;
    identify the disciplining issue based on an analysis of the one or more metrics;
    disable any of the all but one of the redundant oscillators or the one or more time and frequency external inputs associated with the identified disciplining issue; and
    transition to a degraded state when all of the all but one of the redundant oscillators or all of the one or more time and frequency external inputs are in the degraded state.

4. The system as set forth in claim 1 further comprising executable code which when executed by a processor causes the processor to:
    periodically rotate which of the redundant oscillators to set to the holdover state and is set to discipline the cascaded oscillator.

5. The system as set forth in claim 1 wherein further comprising executable code which when executed by a processor when the degraded state is entered, causes the processor to:
    enter the three or more redundant oscillators and the cascaded oscillator into the degraded state, wherein when the degraded state is entered:
        monitor one or more metrics during the discipline of the all but one of the redundant oscillators and the one or more time and frequency external inputs coupled through one or more input components for a disciplining issue;
        identify the disciplining issue based on an analysis of the monitor of the one or more metrics;
        disable any of the all but one of the redundant oscillators or the one or more time and frequency external inputs with the identified disciplining issue;
        enable any of the all but one of the redundant oscillators or the one or more time and frequency external inputs without the identified disciplining issue; and
        exit the degraded state back to the initialization stage or a steady state management stage after a period of time when none of the redundant oscillators or the one or more time and frequency external inputs have the identified disciplining issue.

6. The system as set forth in claim 1 wherein the identified disciplining issue further comprises detected spoofing or a detected fault.

7. A non-transitory computer readable medium having stored thereon instructions comprising executable code which when executed by at least one processor, cause the processor to:
- enter three or more redundant oscillators and a cascaded oscillator of a spoofing resistant reference time source system into an initialization state:
- discipline all but one of the redundant oscillators to a time and frequency external input into normal disciplining steady state with the remaining one of the redundant oscillators in a holdover state;
- when the all but one of the redundant oscillators have reached the normal disciplining steady state, place the all but one of the redundant oscillators into the holdover state, discipline the remaining one of the redundant oscillators to the time and frequency external input, and discipline the cascaded oscillator to one of the all but one of the redundant oscillators now in the holdover state; and
- when the remaining one of the redundant oscillators and the cascaded oscillator have reached the normal disciplining steady state, transition from an initialization stage to a steady state management stage.

8. The medium as set forth in claim 7 further comprising executable code which when executed by a processor causes the processor to:
- during the initialization state, monitor one or more metrics during the discipline of the all but one of the redundant oscillators and the one or more time and frequency external inputs coupled through one or more input components for a disciplining issue;
- identify the disciplining issue based on an analysis of the one or more metrics;
- disable any of the all but one of the redundant oscillators or the one or more time and frequency external inputs associated with the identified disciplining issue; and
- transition to a degraded state when all of the all but one of the redundant oscillators or all of the one or more time and frequency external inputs are in the degraded state.

9. The medium as set forth in claim 7 further comprising executable code which when executed by a processor causes the processor to:
- enter three or more redundant oscillators and the cascaded oscillator into a steady state management stage comprising instructions to:
  - discipline all but one of the redundant oscillators to a time and frequency external input setting the cascaded oscillator to discipline to the remaining one of the redundant oscillators in the holdover state; and
  - output time and frequency external outputs coupled to the cascaded oscillator;
- during the steady state management stage, monitor one or more metrics during the discipline of the all but one of the redundant oscillators and the one or more time and frequency external inputs coupled through one or more input components for a disciplining issue;
- identify the disciplining issue based on an analysis of the one or more metrics;
- disable any of the all but one of the redundant oscillators or the one or more time and frequency external inputs associated with the identified disciplining issue; and
- transition to a degraded state when all of the all but one of the redundant oscillators or all of the one or more time and frequency external inputs are in the degraded state.

10. The medium as set forth in claim 7 further comprising executable code which when executed by a processor causes the processor to:
- periodically rotate which of the redundant oscillators to set to the holdover state and is set to discipline the cascaded oscillator.

11. The medium as set forth in claim 7 further comprising executable code which when executed by a processor, when the degraded state is entered, causes the processor to:
- enter the three or more redundant oscillators and the cascaded oscillator into the degraded state, wherein when the degraded state is entered:
  - monitor one or more metrics during the discipline of the all but one of the redundant oscillators and the one or more time and frequency external inputs coupled through one or more input components for a disciplining issue;
  - identify the disciplining issue based on an analysis of the monitor of the one or more metrics;
  - disable any of the all but one of the redundant oscillators or the one or more time and frequency external inputs with the identified disciplining issue;
  - enable any of the all but one of the redundant oscillators or the one or more time and frequency external inputs without the identified disciplining issue; and
  - exit the degraded state back to the initialization stage or a steady state management stage after a period of time when none of the redundant oscillators or the one or more time and frequency external inputs have the identified disciplining issue.

12. The medium as set forth in claim 7 wherein the identified disciplining issue further comprises detected spoofing or a detected fault.

13. A method comprising:
- entering, by a computing device, three or more redundant oscillators and a cascaded oscillator of a spoofing resistant reference time source system into an initialization state:
- disciplining, by the computing device, all but one of the redundant oscillators to a time and frequency external input into normal disciplining steady state with the remaining one of the redundant oscillators in a holdover state;
- when all but one of the redundant oscillators have reached the normal disciplining steady state, placing, by the computing device, the all but one of the redundant oscillators into the holdover state, disciplining the remaining one of the redundant oscillators to the time and frequency external input, and disciplining the cascaded oscillator to one of the all but one of the redundant oscillators now in the holdover state; and
- when the remaining one of the redundant oscillators and the cascaded oscillator have reached the normal disciplining steady state, transitioning, by the computing device, from an initialization stage to a steady state management stage.

14. The method of claim 13 further comprising:
- during the initialization state, monitoring, by the computing device, one or more metrics during the discipline of the all but one of the redundant oscillators and the one or more time and frequency external inputs coupled through one or more input components for a disciplining issue; and
- identifying, by the computing device, the disciplining issue based on an analysis of the one or more metrics;

disabling, by the computing device, any of the all but one of the redundant oscillators or the one or more time and frequency external inputs associated with the identified disciplining issue; and transitioning, by the computing device, to a degraded state when all of the all but one of the redundant oscillators or all of the one or more time and frequency external inputs are in the degraded state.

15. The method of claim 13 further comprising:

entering, by the computing device, three or more redundant oscillators and the cascaded oscillator into a steady state management stage comprising:
- disciplining all but one of the redundant oscillators to a time and frequency external input setting the cascaded oscillator to discipline to the remaining one of the redundant oscillators in the holdover state; and
- outputting time and frequency external outputs coupled to the cascaded oscillator;

during the steady state management stage, monitoring, by the computing device, one or more metrics during the discipline of the all but one of the redundant oscillators and the one or more time and frequency external inputs coupled through one or more input components for a disciplining issue;

identifying, by the computing device, the disciplining issue based on an analysis of the one or more metrics;

disabling, by the computing device, any of the all but one of the redundant oscillators or the one or more time and frequency external inputs associated with the identified disciplining issue; and transitioning, by the computing device, to a degraded state when all of the all but one of the redundant oscillators or all of the one or more time and frequency external inputs are in the degraded state.

16. The method of claim 13 further comprising:

periodically rotating, by the computing device, which of the redundant oscillators to set to the holdover state and is set to discipline the cascaded oscillator.

17. The method of claim 13 further comprising:

entering, by the computing device, the three or more redundant oscillators and the cascaded oscillator into a degraded state, wherein when the degraded state is entered:
- monitoring one or more metrics during the discipline of the all but one of the redundant oscillators and the one or more time and frequency external inputs coupled through one or more input components for a disciplining issue;
- identifying the disciplining issue based on an analysis of the monitor of the one or more metrics;
- disabling any of the all but one of the redundant oscillators or the one or more time and frequency external inputs with the identified disciplining issue;
- enabling any of the all but one of the redundant oscillators or the one or more time and frequency external inputs without the identified disciplining issue; and
- exiting the degraded state back to the initialization stage or a steady state management stage after a period of time when none of the redundant oscillators or the one or more time and frequency external inputs have the identified disciplining issue.

18. The method of claim 13 wherein the identified disciplining issue further comprises detected spoofing or a detected fault.

* * * * *